US012762230B2

(12) United States Patent
Padiri

(10) Patent No.: US 12,762,230 B2
(45) Date of Patent: Oct. 13, 2026

(54) METHODS FOR HANDLING A POTENTIAL ADVERSARIAL ATTACK ON AN AUTONOMOUS VEHICLE WHILE DRIVING A ROAD

(71) Applicant: Continental Autonomous Mobility Germany GmbH, Ingolstadt (DE)

(72) Inventor: Bhanu Prakash Padiri, Bangalore (IN)

(73) Assignee: AUMOVIO Autonomous Mobility Germany GmbH, Ingolstadt (DE)

( * ) Notice: Subject to any disclaimer, the term of this patent is extended or adjusted under 35 U.S.C. 154(b) by 82 days.

(21) Appl. No.: 18/805,751

(22) Filed: Aug. 15, 2024

(65) Prior Publication Data

US 2025/0068730 A1 Feb. 27, 2025

(30) Foreign Application Priority Data

Aug. 23, 2023 (IN) ............................ 202341056653
Oct. 12, 2023 (GB) ..................................... 2315609

(51) Int. Cl.
*G06F 21/55* (2013.01)
*G06F 21/56* (2013.01)

(52) U.S. Cl.
CPC .......... *G06F 21/554* (2013.01); *G06F 21/566* (2013.01); *G06F 2221/034* (2013.01)

(58) Field of Classification Search
CPC ................. G06F 21/554; G06F 21/566; G06F 2221/034; G06F 21/552; G08G 1/096733; B60W 60/00188
See application file for complete search history.

(56) References Cited

U.S. PATENT DOCUMENTS

| | | | | |
|---|---|---|---|---|
| 10,654,448 | B2 | 5/2020 | Etonye | |
| 10,983,523 | B2 | 4/2021 | Sim | |
| 11,310,269 | B2 * | 4/2022 | Liu | H04L 63/1425 |
| 11,538,336 | B1 * | 12/2022 | Anvari | H04L 67/125 |
| 2019/0191311 | A1 * | 6/2019 | O'Brien | H04W 4/024 |
| 2019/0391576 | A1 * | 12/2019 | Zhang | G08G 1/205 |
| 2023/0056233 | A1 * | 2/2023 | Cyr | H04W 12/009 |
| 2023/0234615 | A1 * | 7/2023 | Wijesekera | G08G 1/0112 701/23 |

(Continued)

FOREIGN PATENT DOCUMENTS

CN 114646322 A 6/2022

OTHER PUBLICATIONS

Yao Deng et al. "An Analysis of Adversarial Attacks and Defenses on Autonomous Driving Models", arXiv:2002.02175v1 [eess.SP], Feb. 6, 2020, 10 pages.

(Continued)

*Primary Examiner* — Ashley L Redhead, Jr.

(57) ABSTRACT

A method of handling a potential adversarial attack on an autonomous vehicle while driving a road, the autonomous vehicle including an algorithm for navigating the autonomous vehicle based on monitoring data related to an environment of the vehicle, the adversarial attack being based on deceiving the algorithm by means of a manipulated traffic indicator arrangement in the environment of the autonomous vehicle and/or triggering the algorithm to stop the autonomous vehicle by means of a stop arrangement in the environment of the autonomous vehicle.

9 Claims, 3 Drawing Sheets

(56) References Cited

U.S. PATENT DOCUMENTS

| | | | | |
|---|---|---|---|---|
| 2023/0267834 | A1* | 8/2023 | Ansari | H04L 9/30<br>701/2 |
| 2023/0343108 | A1* | 10/2023 | Hemantharaja | G06V 10/82 |
| 2023/0399011 | A1* | 12/2023 | Anvari | B60W 50/06 |
| 2024/0089736 | A1* | 3/2024 | Monteuuis | H04L 63/1416 |
| 2024/0101161 | A1* | 3/2024 | Janjua | B60W 60/005 |
| 2024/0182071 | A1* | 6/2024 | Jafari Tafti | B60W 60/00188 |
| 2024/0273859 | A1* | 8/2024 | Peng | G06V 10/761 |
| 2025/0005139 | A1* | 1/2025 | Jenkins | G06F 21/55 |
| 2025/0068960 | A1* | 2/2025 | Yu | G06N 3/08 |

OTHER PUBLICATIONS

Devin Coldeway "Laying a trap for self-driving cars", https://techcrunch.com/2017/03/17/laying-a-trap-for-self-driving-cars/, 2017, Techcrunch, 10 pages.

Srishti Deoras "How to Deter Adversarial Attacks in Computer Vision Models", Analytics India Magazine, https://analyticsindiamag.com/, 2021.

Han Xu et al. "Adversarial Attacks and Defenses in Images, Graphs and Text: A Review", arXiv:1909.08072v2 [cs.LG] Oct. 9, 2019, 29 pages.

* cited by examiner

METHODS FOR HANDLING A POTENTIAL ADVERSARIAL ATTACK ON AN AUTONOMOUS VEHICLE WHILE DRIVING A ROAD

CROSS-REFERENCE TO RELATED APPLICATIONS

The present application claims priority from Indian patent application Ser. No. 202341056653 filed on Aug. 23, 2023, in the Indian Patent Office and United Kingdom Patent Application No. 2315609.4 filed on Oct. 12, 2023, in the Intellectual Property Office of the United Kingdom, the disclosures of which are herein incorporated by reference.

BACKGROUND

1. Field

Aspects and objects of embodiments of the present application relate to methods for handling a potential adversarial attack on an autonomous vehicle while driving a road.

2. Description of Related Art

Autonomous-driven (AD) robots or vehicles may be subject to adversarial attacks where the scenes/objects in their environment are manipulated in order to deceive an algorithm, for example a machine learning algorithm, executed by the AD vehicles. Potential security threats to AD vehicles may occur in deserted environments, at night, etc. For example, when AD vehicles are on remote roads or at deserted places, there is a risk that an attack from miscreants or robbers occurs. Humans may fool AD vehicles by taking advantage of how the vehicles are designed and how they intend to behave. Especially AD trucks, where there are no humans on board and which may carry goods and materials, can be a target of such attacks in the future.

In one scenario, someone may modify traffic signs or simulate traffic lights. For example, a robber may hold and show a STOP sign in front of the AD truck and once the vehicle has stopped, they might get into the AD truck and rob the goods and materials on board. In another scenario, a mob may attack the AD truck. In yet another scenario, someone may deceive the algorithm by placing construction signs (pylons, vehicles with road construction signs) on the road.

In order to handle adversarial attacks, the algorithm may be adapted and made robust. The current deep learning algorithms, however, may be difficult to adapt and to made robust against such attacks. Thus, it would be desirable to have fallback methods at hand that can help to protect AD vehicles against such attacks.

SUMMARY

Aspects and objects of embodiments of the present application provide improved methods for handling a potential adversarial attack on an autonomous vehicle while driving a road.

According to an aspect of an embodiment, there is provided a method for handling a potential adversarial attack on an autonomous vehicle while driving a road, the autonomous vehicle including an algorithm for navigating the autonomous vehicle based on monitoring data related to an environment of the vehicle, the adversarial attack being based on deceiving the algorithm by means of a manipulated traffic indicator arrangement in the environment of the autonomous vehicle, wherein validated and/or certified first traffic indicator arrangement data for said environment is provided to the autonomous vehicle by a remote control center, the method including:

a) Monitoring, by the autonomous vehicle, an environment of the vehicle in order to generate monitoring data related to a potential traffic indicator arrangement in said environment;

b) Recognizing, from the monitoring data, a traffic indicator arrangement in said environment by means of the algorithm used in the autonomous vehicle in order to generate second traffic indicator arrangement data;

c) Comparing the first traffic indicator arrangement data and the second traffic indicator arrangement data; and d) Based on the comparison, ignoring one of the first traffic indicator arrangement data and the second traffic indicator arrangement data and navigating the autonomous vehicle by using the other one of the second traffic indicator arrangement data and the first traffic indicator arrangement data.

An advantage of the method may be that adversarial attacks based on deceiving the algorithm by means of a manipulated traffic indicator arrangement in the environment of the autonomous vehicle may be discovered. In case where the algorithm fails to discover such an attack or just behaves as it should, there would be thus still a fallback mechanism that helps to protect the AD vehicle against the attack. The method is based on comparing a recognized traffic indicator arrangement data with a validated and/or certified traffic indicator arrangement data provided by a remote control center. The validated and/or certified traffic indicator arrangement data can be maintained in a safe environment protected against adversarial attacks. Governmental and/or security authorities may regularly update the validated and/or certified data such that manipulated traffic indicator arrangements can be easily discovered. This increases the security of AD vehicles.

Preferably, step d) comprises:

d1) Based on the comparison, transmitting, by the autonomous vehicle, an alert to a government and/or security agency, the remote control center and/or other vehicles in the environment.

An advantage of the method may be that if an attack is discovered, a government and/or security agency, such as the police, the remote control center and/or other vehicles may be alerted. Other vehicles may change the route accordingly. Thus, the attack is prevented to escalate towards other vehicles.

Preferably, the traffic indicator arrangement includes one or more traffic indicators and/or barriers, such as traffic lights, traffic road and/or lane markings, traffic signs, traffic cones, and/or construction site barriers and/or markings.

An advantage of the method may be that the validated and/or certified data can be related to different kinds of traffic indicators and/or barriers. A geolocation and/or ground offset of the traffic indicators and/or barriers can be stored and maintained in a database of the remote control center. Additionally, a function, status, form, and/or nature of the traffic indicators and/or barriers can be stored in the database.

Preferably, the first traffic indicator arrangement data and the second traffic indicator arrangement data are compared with respect to a geolocation, ground offset, function, status, form, and/or nature of one or more traffic indicators and/or barriers of the traffic indicator arrangement.

Preferably, steps c) and d) comprise:

c1) If the comparing results in a discrepancy between the first traffic indicator arrangement data and the second traffic indicator arrangement, transmitting, by the autonomous vehicle, the monitoring data to the control center; and:

c2) By the control center, analyzing the monitoring data and/or receiving an analysis input related to the monitoring data and d2) based on the analyzing and/or the received analysis input, causing the autonomous vehicle to ignore one of the first traffic indicator arrangement data and the second traffic indicator arrangement data and to navigate the autonomous vehicle by using the other one of the second traffic indicator arrangement data and the first traffic indicator arrangement data; and/or c3) By the control center, analyzing the monitoring data and/or receiving an analysis input related to the monitoring data and d3) based on the analyzing and/or the received analysis input, updating the first traffic indicator arrangement data for said environment and providing the updated first traffic indicator arrangement data to the autonomous vehicle and/or to one or more other vehicles.

An advantage of the method can be that if there is a discrepancy, the monitoring data is transmitted to the control center. The control center itself can execute an algorithm on the monitoring data in order to discover an adversarial attack. Additionally, or alternatively, the control center can be supervised by humans so that they can decide whether the discrepancy relates to an official and/or legally compliant change of the traffic indicator arrangement or originates from an adversarial attack. The validated and/or certified data can be updated accordingly and provided to one or more other vehicles. This increases the security of AD vehicles.

According to an aspect of an embodiment, there is provided a method for handling a potential adversarial attack on an autonomous vehicle while driving a road, the autonomous vehicle including an algorithm for navigating the autonomous vehicle based on monitoring data related to an environment of the vehicle, the adversarial attack being based on triggering the algorithm to stop the autonomous vehicle by means of a stop arrangement in the environment of the autonomous vehicle, the method comprising:

e) Monitoring, by the autonomous vehicle, an environment of the vehicle in order to generate monitoring data related to a potential stop arrangement;

f) Recognizing, from the monitoring data, a stop arrangement in said environment by means of the algorithm used in the autonomous vehicle;

g) Transmitting the monitoring data to a remote control center; and h) By the control center, analyzing the monitoring data and/or receiving an analysis input related to the monitoring data and based on the analyzing and/or the received analysis input, causing the autonomous vehicle to initiate an adversarial attack defense mode and/or transmitting an alert to a government and/or security agency and/or to one or more other vehicles.

An advantage of the method may be that adversarial attacks based on triggering the algorithm to stop the autonomous vehicle by means of a stop arrangement in the environment of the autonomous vehicle may be discovered. In case where the algorithm fails to discover such an attack or just behaves as it should, there would be thus still a fallback mechanism that helps to protect the AD vehicle against the attack. The method is based on transmitting the monitoring data to the remote control center. The control center itself can execute an algorithm on the monitoring data in order to discover an adversarial attack. Additionally, or alternatively, the control center can be supervised by humans so that they can decide whether the discrepancy relates to an official and/or legally compliant change of the traffic indicator arrangement or originates from an adversarial attack. If an attack is discovered, a government and/or security agency, such as the police, and/or other vehicles may be alerted. Other vehicles may change the route accordingly. Thus, the attack is prevented to escalate towards other vehicles. The affected autonomous vehicle can initiate an adversarial attack defense mode. This increases the security of AD vehicles.

Preferably, the stop arrangement includes one or more traffic indicators and/or barriers and/or one or more vulnerable road users.

Preferably, the adversarial attack defense mode includes one, several or all of the following:

h1) Activating one or more signal lights, a vehicle horn, and/or a sound alarm of the autonomous vehicle; and/or h2) Transmitting an alert to a government and/or security agency and/or to one or more other vehicles in the environment; and/or h3) Activating an unmanned aerial vehicle, such as drone, installed at the autonomous vehicle.

An advantage of the method can be that the autonomous vehicle itself can transmit an alert to other vehicles in the environment. The other vehicles may change the route accordingly. Thus, the attack is prevented to escalate towards other vehicles.

In preferred embodiments, one or more features of the first method according to any of the preceding embodiments may be combined with the second method according to any of the preceding embodiments. In preferred embodiments, one or more features of the second method according to any of the preceding embodiments may be combined with the first method according to any of the preceding embodiments.

According to an aspect of an embodiment, there is provided a system comprising means adapted to execute the steps of the method according to any of the preceding embodiments.

According to an aspect of an embodiment, there is provided a computer program comprising instructions to cause the system to execute the steps of the method according to any of the preceding embodiments.

According to an aspect of an embodiment, there is provided a computer-readable medium having stored thereon the computer program.

Aspects and objects of the embodiments of the present application may the following advantages and effects:

An autonomous vehicle fitted with different sensors like front camera/surround cameras, LIDAR, radar, ultrasonics, can perceive the surroundings in order to do path planning and later take action (brake, accelerate or steer, stop, etc.). High resolution cameras (1.5 MPix to >8.3 MPix) with different FOVs (45° to >195°) may capture images around and gets processed to do semantic information like: sign recognition/lane information/traffic lights etc. as well as object detections/recognitions. In some cases, the images from other cameras may be stitched to get 360° views and to perform object detections on the combined images afterwards.

Along with cameras, radars with long range and short range (250 m Range, ±60° FoV,/±0.2° hor/±1° ver operating at 66 MHz or 77 MHz etc.) may also be used to detect objects like pedestrians, cyclists, motorbikes, tunnels, etc.

Autonomous-driven (AD) vehicles and/or trucks can also be enabled with "unmanned remotely-supervised" modes. Furthermore, V2X-communication (e.g., vehicle-To-Infrastructure) may be used for enhanced security to communicate with control centers and governmental and/or security agencies, such as the police.

The other digital piece of infrastructure are preferably HD maps. Between weather, construction, and changing traffic patterns, the maps should be regular updated. In-depth maps of all roads the trucks will drive on, should be preferably developed in advance. Long before a self-driving truck ever makes its journey down the highways, mapping engineers can gather as much data about the road as possible. Also mapping solutions that include access to HD maps with centimeter level accuracy (both offline and online maps, preferably with cloud access) may be used.

Once these maps are developed, autonomous trucks are preferable able to navigate using both real-time and historical knowledge of the road. Via the trucks' location system, cameras, lidar systems, and so on, trucks can get "the big picture" of the road as well as the necessary details. With respect to driving lines or drivable surfaces, mapping is one of the most important parts of the digital infrastructure stack.

Aspects and objects of the embodiments of the present application may address challenging situations that occur in real time and that may be more deceiving to the AD system than just the algorithm.

Aspects and objects of embodiments of the present application may address challenging situations that occur during AD situations, especially in AD trucking where there are no drivers/humans.

Such challenging situations may include, but are not limited to the following:

- If someone tries to modify traffic signs or simulate traffic lights to divert AD trucks carrying goods;
- If a mob attacks AD vehicles and tries to get inside AD trucks; and/or
- If someone deceives the AD system by placing construction signs (pylons and/or other vehicle with road construction signs).

Aspects and objects of embodiments of the present application may solve false positives and also resolves confusion when multi-sensor fusion is applied. Many false detections may cause problems especially during autonomous driving. Sometimes redundancy also creates confusion to the system. Despite sensor fusion or redundancy in place, many corner/edge cases may affect the performance of ADAS/AD systems. As scenarios of detections are recreated, the system may think and check with different algorithms which would add one more level of confidence. Aspects and objects of embodiments of the present application may tackle multiple edge cases in nights/shadows/occlusions/blockages, etc. Preferred embodiments can be selectively triggered and hence computational cost may be minimized and used only when needed.

BRIEF DESCRIPTION OF THE DRAWINGS

Embodiments of the present application are now explained in more detail with reference to the accompanying drawings, in which.

DETAILED DESCRIPTION

Figure 1:
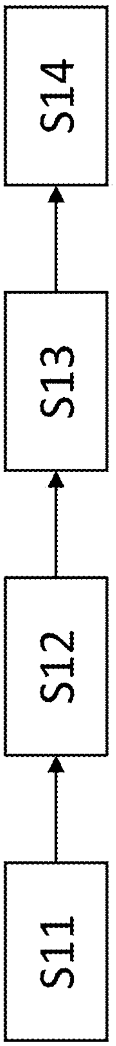
FIG. 1 is a flowchart of a method for handling a potential adversarial attack on an autonomous vehicle driving a road, according to an embodiment.

FIG. 1 is a flowchart of a method for handling a potential adversarial attack on an autonomous vehicle driving a road, according to an embodiment.

The autonomous vehicle may be, for example, a robot, car or truck. The vehicle includes an algorithm for navigating the autonomous vehicle based on monitoring data related to an environment of the vehicle. For this, the vehicle comprises one or more monitoring devices, such as a LIDAR device, a radar device, an ultrasonic device, an audio and/or video capturing device, and so on. The one or more monitoring devices are configured for monitoring the environment of the vehicle in order to generate the monitoring data. The vehicle may further comprise a location device for determining a geolocation and/or ground offset of the vehicle and/or the environment.

A remote control center provides validated and/or certified first traffic arrangement data to the vehicle. The remote control center may be configured as a data processing device, such as a server. The first traffic arrangement data may include, for example, geolocation and/or ground offset data for a traffic indicator arrangement in the environment of the vehicle. The traffic arrangement may include one or more traffic indicators and/or barriers, such as traffic lights, traffic road and/or lane markings, traffic signs, traffic cones and/or construction site barriers and/or markings.

In a step S11, the method includes:

Monitoring, by the autonomous vehicle, the environment of the vehicle in order to generate the monitoring data related to a potential traffic indicator arrangement in said environment.

In a step S12, the method includes:

Recognizing, from the monitoring data, the traffic indicator arrangement in said environment by means of the algorithm used in the autonomous vehicle in order to generate second traffic indicator arrangement data.

In a step S13, the method includes:

Comparing the first traffic indicator arrangement data and the second traffic indicator arrangement data.

In a step S14, the method includes:

Based on the comparison, ignoring one of the first traffic indicator arrangement data and the second traffic indicator arrangement data and navigating the autonomous vehicle by using the other one of the second traffic indicator arrangement data and the first traffic indicator arrangement data.

The potential adversarial attack on the vehicle may be, for example, based on deceiving the algorithm by means of a manipulated traffic indicator arrangement in the environment of the autonomous vehicle.

The traffic indicator arrangement in the environment may be manipulated, for example, by adding to or removing from the traffic indicator arrangement one or more traffic indicators and/or barriers. Furthermore, the traffic indicator arrangement may be manipulated, for example, by changing one or more traffic indicators and/or barriers and/or a position thereof. For example, one or more traffic signs may be pasted over with posters showing a different traffic sign and/or may be positioned elsewhere in the environment. The manipulation can also be designed in such a way that it would not be visible or rarely noticeable to humans, but capable of deceiving the algorithm.

In order to handle such an adversarial attack on the autonomous vehicle, the first traffic indicator arrangement data and the second traffic indicator arrangement data are compared. The comparison can be performed by the vehicle. Additionally, or alternatively, the comparison can be performed by the remote control center providing the first traffic indicator arrangement data.

For comparison, the vehicle may determine the geolocation and/or ground offset of the one or more traffic indicators and/or barriers of the traffic indicator arrangement in the environment. The vehicle may further determine a function, status, form, nature of the one or more traffic indicators and/or barriers of the traffic indicator arrangement in the environment. The first traffic indicator arrangement data and the second traffic indicator arrangement data may then be compared, by the vehicle and/or the remote control center, with respect to said geolocation, ground offset, function, status, form, and/or nature of the one or more traffic indicators and/or barriers of the traffic indicator arrangement in the environment. The first traffic indicator arrangement data and the second traffic indicator arrangement data may further be compared with respect to timestamps that may be included in the data, respectively. The first traffic indicator arrangement data is validated and/or certified. The second traffic indicator arrangement data may be different to the first traffic indicator arrangement data.

The difference between the first traffic indicator arrangement data and the second traffic arrangement data may originate from an official and/or legally compliant change of the traffic indicator arrangement that has not yet been registered in the first traffic indicator arrangement data. For example, a construction site may have occurred recently in the environment. The difference between the first traffic indicator arrangement data and the second traffic arrangement data may, however, also originate from an adversarial attack on the vehicle.

When comparing the first traffic indicator arrangement data and the second traffic arrangement data, the difference may, for example, be checked with respect to plausibility, a threshold, and/or a difference, e.g., in the timestamps. Based on the comparison, the vehicle may ignore one of the first traffic indicator arrangement data and the second traffic indicator arrangement data and may navigate the autonomous vehicle by using the other one of the second traffic indicator arrangement data and the first traffic indicator arrangement data.

Figure 2:
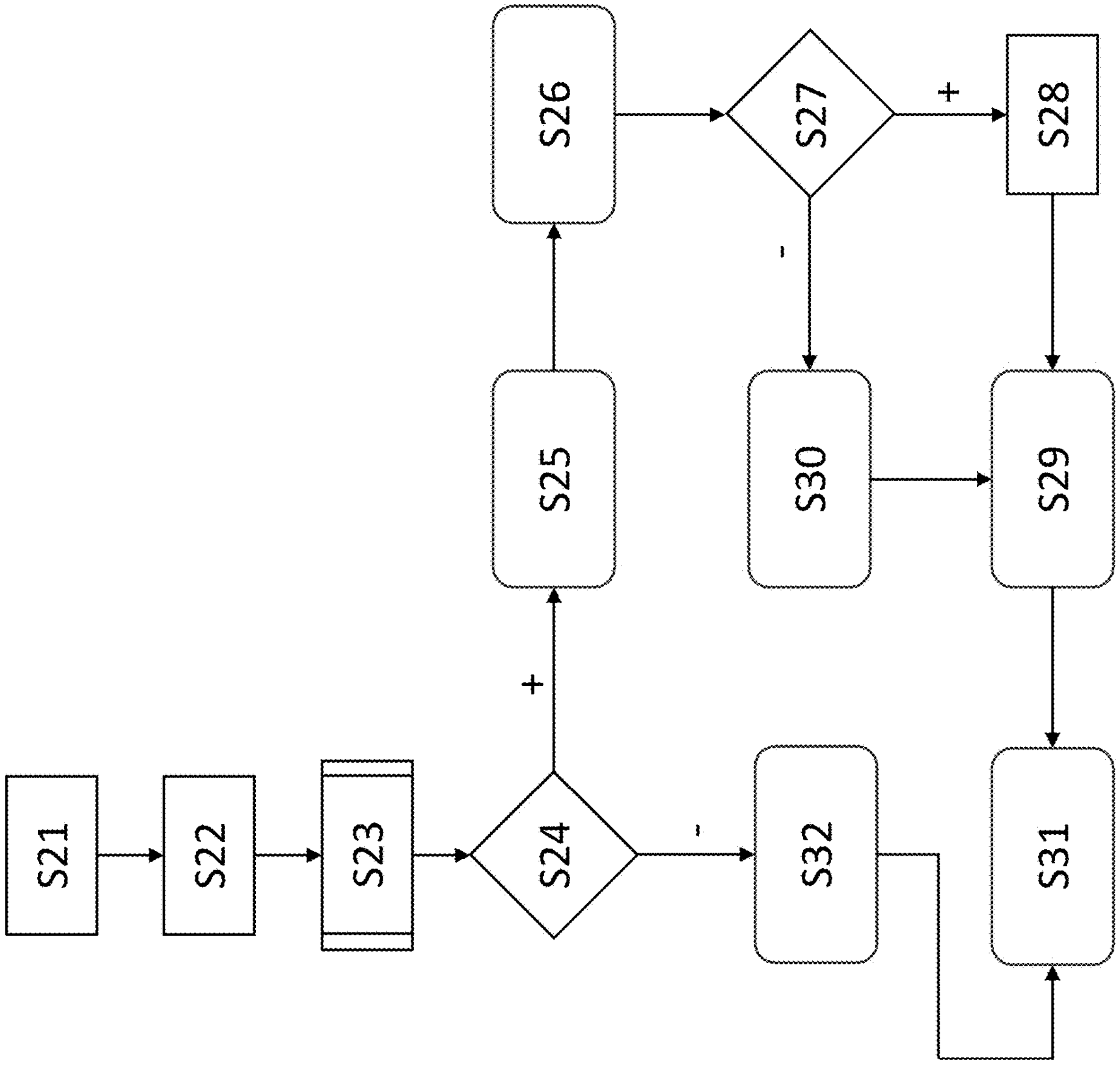
FIG. 2 is a flowchart of a method for handling a potential adversarial attack on an autonomous vehicle driving a road, according to an embodiment.

FIG. 2 is a flowchart of a method for handling a potential adversarial attack on an autonomous vehicle driving a road, according to an embodiment.

In a step S21, the method performs step S11. In a step S22, the method performs step S12. In a step S23, the method performs step S13.

In a step S24, the method determines, whether there is a discrepancy between the first traffic indicator arrangement data and the second traffic indicator arrangement data. If there is a discrepancy, the method continues with steps S25 and S26 comprising:

Step S25: transmitting, by the autonomous vehicle, an alert to the remote control center; and Step S26: transmitting, by the autonomous vehicle, the monitoring data to the control center.

The control center can then, in a step S27, analyze the monitoring data and/or receive an analysis input related to the monitoring data. For example, a human supervisor may analyze the monitoring data and input the analysis to the control center. The analyzing and/or the received analysis input may determine, whether the discrepancy originates from an official and/or legally compliant change of the traffic indicator arrangement or from an adversarial attack. In step S27, the method may further comprise:

Determining the relevant traffic indicator arrangement data from the first traffic indicator arrangement data and the second traffic indicator arrangement data.

If in step S27, the relevant traffic indicator arrangement data is determined to be the first traffic indicator arrangement data, the method continues with a step S28 comprising:

Causing the autonomous vehicle to ignore the second traffic indicator arrangement data and to navigate the autonomous vehicle by using the first traffic indicator arrangement data.

Furthermore, the control center may, in a step S29, update the first traffic indicator arrangement data for said environment. For example, the update of the first traffic indicator arrangement data may include an alert that there is an adversarial attack based on a manipulated traffic indicator arrangement and the relevant traffic indicator arrangement data is still the first traffic indicator arrangement data. The update of the first traffic indicator arrangement data may also include to update the timestamp of the relevant traffic indicator arrangement data. The updated first traffic indicator arrangement data may be provided to the autonomous vehicle and/or to one or more other vehicles. The other vehicles may receive the updated first traffic indicator arrangement data and, if they are autonomous, navigate by using the updated first traffic indicator arrangement data.

If in step S27, the relevant traffic indicator arrangement data is determined to be the second traffic indicator arrangement data, the method continues with a step S30:

Causing the autonomous vehicle to ignore the first traffic indicator arrangement data and to navigate the autonomous vehicle by using the second traffic indicator arrangement data.

Furthermore, the control center may again perform the step S29 and update the first traffic indicator arrangement data for said environment. For example, the update of the first traffic indicator arrangement data may include an alert that there is an official and/or legally compliant change of the traffic indicator arrangement that has not yet been registered in the first traffic indicator arrangement data and the relevant traffic indicator arrangement data is now the second traffic indicator arrangement data. The update of the first traffic indicator arrangement data may also include to update the timestamp of the relevant traffic indicator arrangement data. The updated first traffic indicator arrangement data may be provided to the autonomous vehicle and/or to one or more other vehicles. The other vehicles may receive the updated first traffic indicator arrangement data and, if they are autonomous, navigate by using the updated first traffic indicator arrangement data.

In a step S31, the method performs step S14.

If in step S24, the method determines, whether there is no discrepancy between the first traffic indicator arrangement data and the second traffic indicator arrangement data, the method continues with step S32:

Ignoring first traffic indicator arrangement data and navigating the autonomous vehicle by using the second traffic indicator arrangement data.

Thus, the step S32 leads again to step S31.

Figure 3:
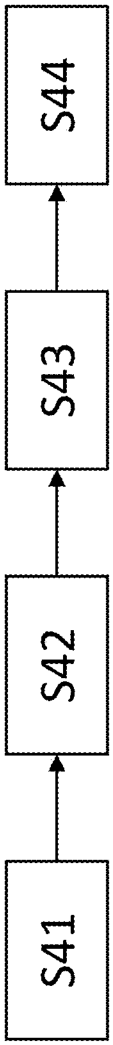
FIG. 3 is a flowchart for handling a potential adversarial attack on an autonomous vehicle driving a road, according to an embodiment.

FIG. 3 is a flowchart of a method for handling a potential adversarial attack on an autonomous vehicle driving a road, according to an embodiment.

In a step S41, the method includes:

Monitoring, by the autonomous vehicle, an environment of the vehicle in order to generate monitoring data related to a potential stop arrangement.

In a step S42, the method includes:

Recognizing, from the monitoring data, a stop arrangement in said environment by means of the algorithm used in the autonomous vehicle.

In a step S43, the method includes:

Transmitting the monitoring data to a remote control center.

In a step S44, the method includes:

By the control center, analyzing the monitoring data and/or receiving an analysis input related to the monitoring data and based on the analyzing and/or the received analysis input, causing the autonomous vehicle to initiate an adversarial attack defense mode and/or transmitting an alert to a government and/or security agency and/or to one or more other vehicles.

The potential adversarial attack on the vehicle may be, for example, based on triggering the algorithm to stop the autonomous vehicle by means of a stop arrangement in the environment of the autonomous vehicle. The stop arrangement may, for example, include one or more traffic indicators and/or barriers and/or one or more vulnerable road users. For example, individuals in front of the vehicle may trigger the algorithm to stop the autonomous vehicle.

In order to handle such an adversarial attack on the autonomous vehicle, the monitoring data is transmitted to the remote control center.

The control center can then analyze the monitoring data and/or receive an analysis input related to the monitoring data. For example, a human supervisor may analyze the monitoring data and input the analysis to the control center. The analyzing and/or the received analysis input may determine, whether the stop arrangement is an official and/or legally compliant stop arrangement, for example due to a traffic jam, or originates from an adversarial attack.

Based on the analyzing and/or the received analysis input the autonomous vehicle is caused to initiate an adversarial attack defense mode. Additionally, or alternatively, the control center may transmit an alert to a government and/or security and/or to one or more other vehicles. The other vehicles may receive the alert and, if they are autonomous, choose an alternative route.

The adversarial attack defense mode of the autonomous vehicle may include, for example:

Activating one or more signal lights, a vehicle horn, and/or a sound alarm of the autonomous vehicle; and/or Transmitting, by the autonomous vehicle, an alert to a government and/or security agency and/or to one or more other vehicles in the environment; and/or Activating an unmanned aerial vehicle, such as drone, installed at the autonomous vehicle.

Aspects of the embodiments also provide a system comprising means adapted to execute the steps of the first and/or the second method as described. The system includes the autonomous vehicle. The system may further include the remote control center. Aspects of the embodiments provide a computer program comprising instructions to cause the system to execute the steps of the first and/or the second method. The embodiment further provides a computer-readable medium having stored thereon the computer program.

Some aspects of the embodiments of the present application may be summarized as follows:

In a first use case, an aspect of an embodiment preferably solves cases where an attacker tries to trap an AD truck/vehicle by showing signs in wrong places. In an aspect of an embodiment, an AD vehicle compares the critical detections (signs/lanes/poles/static landmarks, etc.), i.e., "recognized signs", with HD map information to cross check if the detections are in the right place. The information extracted from the HD map preferably includes coordinates (Lat/long/Height from ground/offset from road, etc.) of detected signs/traffic lights, etc.

Once extracted, the recognized sign/traffic light is then compared. If the coordinates match within the acceptable threshold, then the AD truck preferably continues the way it must respond. If there is mismatch (especially concerning critical signs), triggering the vehicle to change its path or to stop or high speeds etc., then an alert preferably is raised to a central station or communicated using V2X.

For example, if someone is holding a STOP sign at a location intending to deceive the AD vehicle, then the coordinates would not match with the received coordinates of the HD map. In such case, the AD truck can ignore and override the STOP sign.

In a second use case, someone may place construction signs/pylons, etc. to deceive the AD vehicle and may try to re-route the AD vehicle by triggering the AD vehicle to change the path/course/route instead of its predefined HUB to HUB path. In this cases, the AD vehicle preferably compares the detection with a recently updated alert on the HD map. If there is no update of the HD map, the AD vehicles seeks inputs from control center by LIVE feeding the cameras (front, SVC, rear) and sensor information to control center which decides on detour or override and go ahead.

Also, if the route diversion is not a small lane change, but a long detour (system derives from diverted route map and extracts how long it will deviate from current route) or if the route diversion includes to leave a highway, the AD vehicle preferably seeks help with the control center.

If the control center determines that there is indeed a construction site, then the HD map is informed of the construction zone details and gets updated with, for example, sample camera images and time. In this case, other users get updated information.

In a third use case, someone may keep fooling the AD vehicle by moving in front. Pedestrians moving around an AD vehicle may trigger the latter to stops, because it is programmed to stop for VRU users like pedestrians/bicyclists etc. In this case, the AD vehicle may preferably wait for some predefined time (e.g., two minutes) and may connect to the control center with a live feed of a possible mob attack or intruders.

If control center determines that there are indeed miscreants trying to attack the vehicle, the vehicle can preferably turn on emergency lights blinking around it and sounding alarms to scare the miscreants and alert other vehicles around. If the attack does not stop, the vehicle may send an alert to a nearest police station by V2X communication. For additional and immediate action, a drone can be placed on the truck and can scare the miscreants with flash lights/spraying pepper gas on them (based on detection and tracking the miscreants information from the AD vehicle). The vehicle lights may glow on and off and spreading distress signals across and may initiate sound alarms to get attention and scare robbers or miscreants.

The invention claimed is:

1. A method for handling a potential adversarial attack on an autonomous vehicle while driving a road, the autonomous vehicle including an algorithm for navigating the autonomous vehicle based on monitoring data related to an environment of the vehicle, the adversarial attack being based on deceiving the algorithm by means of a manipulated traffic indicator arrangement in the environment of the autonomous vehicle, wherein validated and/or certified first traffic indicator arrangement data for said environment is provided to the autonomous vehicle by a remote control center, the method comprising:

a) Monitoring, by the autonomous vehicle, an environment of the vehicle in order to generate monitoring data related to a potential traffic indicator arrangement in said environment;

b) Recognizing, from the monitoring data, a traffic indicator arrangement in said environment by means of the algorithm used in the autonomous vehicle in order to generate second traffic indicator arrangement data;

c) Comparing the first traffic indicator arrangement data and the second traffic indicator arrangement data; and d) Based on the comparison, ignoring one of the first traffic indicator arrangement data and the second traffic indicator arrangement data and navigating the autonomous vehicle by using the other one of the second traffic indicator arrangement data and the first traffic indicator arrangement data.

2. The method according to claim 1, characterized in that step d) comprises:

d1) Based on the comparison, transmitting, by the autonomous vehicle, an alert to a government and/or security agency, the remote control center and/or other vehicles in the environment.

3. The method according to claim 1, characterized in that the traffic indicator arrangement includes one or more traffic indicators and/or barriers, such as traffic lights, traffic road and/or lane markings, traffic signs, traffic cones, and/or construction site barriers and/or markings.

4. The method according to claim 3, characterized in that the first traffic indicator arrangement data and the second traffic indicator arrangement data are compared with respect to geolocation, ground offset, function, status, form, and/or nature of the one or more traffic indicators and/or barriers of the traffic indicator arrangement.

5. The method according to claim 1, characterized in that steps c) and d) comprise:

c1) If the comparing results in a discrepancy between the first traffic indicator arrangement data and the second traffic indicator arrangement, transmitting, by the autonomous vehicle, the monitoring data to the control center; and:

c2) By the control center, analyzing the monitoring data and/or receiving an analysis input related to the monitoring data and d2) causing the autonomous vehicle to ignore one of the first traffic indicator arrangement data and the second traffic indicator arrangement data and to navigate the autonomous vehicle by using the other one of the second traffic indicator arrangement data and the first traffic indicator arrangement data; and/or c3) By the control center, analyzing the monitoring data and/or receiving an analysis input related to the monitoring data and d3) updating the first traffic indicator arrangement data for said environment and providing the updated first traffic indicator arrangement data to the autonomous vehicle and/or to one or more other vehicles.

6. A method for handling a potential adversarial attack on an autonomous vehicle while driving a road, the autonomous vehicle including an algorithm for navigating the autonomous vehicle based on monitoring data related to an environment of the vehicle, the adversarial attack being based on triggering the algorithm to stop the autonomous vehicle by means of a stop arrangement in the environment of the autonomous vehicle, the method comprising:

e) Monitoring, by the autonomous vehicle, an environment of the vehicle in order to generate monitoring data related to a potential stop arrangement;

f) Recognizing, from the monitoring data, a stop arrangement in said environment by means of the algorithm used in the autonomous vehicle;

g) Transmitting the monitoring data to a remote control center; and h) By the control center, analyzing the monitoring data and/or receiving an analysis input related to the monitoring data and based on the analyzing and/or the received analysis input, causing the autonomous vehicle to initiate an adversarial attack defense mode and/or transmitting an alert to a government and/or security agency and/or to one or more other vehicles.

7. The method according to claim 6, characterized in that the stop arrangement includes one or more traffic indicators and/or barriers and/or one or more vulnerable road users.

8. The method according to claim 6, characterized in that the adversarial attack defense mode includes one, several or all of the following:

h1) Activating one or more signal lights, a vehicle horn, and/or a sound alarm of the autonomous vehicle; and/or h2) Transmitting an alert to a government and/or security agency and/or to one or more other vehicles in the environment; and/or h3) Activating an unmanned aerial vehicle, such as a drone, installed at the autonomous vehicle.

9. A non-transitory computer-readable medium having stored thereon instructions which, when executed by a processor, causes the processor to perform a method for handling a potential adversarial attack on an autonomous vehicle while driving a road, the autonomous vehicle including an algorithm for navigating the autonomous vehicle based on monitoring data related to an environment of the vehicle, the adversarial attack being based on triggering the algorithm to stop the autonomous vehicle by means of a stop arrangement in the environment of the autonomous vehicle, the method comprising:

e) Monitoring, by the autonomous vehicle, an environment of the vehicle in order to generate monitoring data related to a potential stop arrangement;

f) Recognizing, from the monitoring data, a stop arrangement in said environment by means of the algorithm used in the autonomous vehicle;

g) Transmitting the monitoring data to a remote control center; and h) By the control center, analyzing the monitoring data and/or receiving an analysis input related to the monitoring data and based on the analyzing and/or the received analysis input, causing the autonomous vehicle to initiate an adversarial attack defense mode and/or transmitting an alert to a government and/or security agency and/or to one or more other vehicles.

* * * * *